United States Patent
Lewis et al.

[11] Patent Number: 5,970,451
[45] Date of Patent: Oct. 19, 1999

[54] METHOD FOR CORRECTING FREQUENTLY MISRECOGNIZED WORDS OR COMMAND IN SPEECH APPLICATION

[75] Inventors: James R. Lewis, Delray Beach; Kerry A. Ortega, Deerfield Beach, both of Fla.; Barbara E. Ballard, Raleigh, N.C.; Ronald VanBuskirk, Indiantown, Fla.

[73] Assignee: International Business Machines Corporation, Armonk, N.Y.

[21] Appl. No.: 09/060,122

[22] Filed: Apr. 14, 1998

[51] Int. Cl.⁶ ........................................ G10L 3/00
[52] U.S. Cl. ............................ 704/251; 704/235
[58] Field of Search ....................... 704/251, 244, 704/235, 275

[56] References Cited

U.S. PATENT DOCUMENTS

| | | | |
|---|---|---|---|
| 4,829,576 | 5/1989 | Porter | 704/235 |
| 5,027,406 | 6/1991 | Roberts et al. | 395/2.53 |
| 5,500,920 | 3/1996 | Kupiec | 395/2.79 |
| 5,550,930 | 8/1996 | Berman et al. | 382/187 |
| 5,615,296 | 3/1997 | Stanford et al. | 704/201 |
| 5,617,488 | 4/1997 | Hong et al. | 382/229 |
| 5,799,279 | 8/1998 | Gould et al. | 704/275 |
| 5,864,805 | 1/1999 | Chen et al. | 704/235 |
| 5,883,986 | 3/1999 | Kopiec et al. | 382/310 |
| 5,903,864 | 5/1999 | Gadbois et al. | 704/251 |

*Primary Examiner*—Richemond Dorvil
*Attorney, Agent, or Firm*—Quarles & Brady LLP

[57] ABSTRACT

A method for correcting frequently misrecognized words and commands in a speech application. According to the method, when a need for correcting a frequently misrecognized word/command spoken by a user is detected, a recording is made of the misrecognized word/command in isolation. Subsequently, an in-isolation base form for the misrecognized word/command is established from the in-isolation recording. The in-isolation base form is then saved and the misrecognized word/command in recorded in context. Next, an in-context base form is established for the misrecognized word/command from the context recording and a comparison is made between the in-isolation and in-context base forms. The in-context base form is saved only if the in-isolation and in-context base forms are markedly different from one another. A sentence is displayed using the frequently misrecognized word/command in context and the user is prompted to speak the sentence. The sentence is then recognized using the speech application and the user is prompted to confirm whether or not the frequently misrecognized word/command was properly recognized. The method is terminated if the frequently misrecognized word/command was properly recognized.

16 Claims, 2 Drawing Sheets

METHOD FOR CORRECTING FREQUENTLY MISRECOGNIZED WORDS OR COMMAND IN SPEECH APPLICATION

BACKGROUND OF THE INVENTION

1. Field of the Invention

This invention is related generally to the field of speech recognition, and in particular, to a method for diagnosing and overcoming repeated misrecognitions of the same words.

2. Description of Related Art

Sometimes a speech system has problems building clean, accurate base forms. Base forms are instructions as to the way words sound or are pronounced. Users may sometimes have problems with certain words always being misrecognized by a speech recognition system. Presently, whenever the user corrects the same word for some given number of times, for example three times, a speech application will often display a record word dialog so the user can record his or her pronunciation for the word. After the user makes the correction, the correction count starts over again with zero. Thus, if a user has problems with recognition of a particular word, the record word dialog can appear many times. In fact, this is often the case with high frequency words such as "a, an, and, the, it, of", and the like. This repeated presentation of the record word dialog can be very annoying, to say the least. Accordingly, for such high-frequency words, speech applications often do not invoke the record word dialog for these words. This prevents the user from ever recording the user's own pronunciation for the high-frequency words. Thus, if the user has an unusual pronunciation for one of these words, there is no opportunity to record it, so the application must provide another mechanism, for example adding a record word command to the correction window, to force a recording of the word. Unfortunately, most users will not realize they need to do anything special to establish a good base form for the word, so recognition for that word will continue to be poor. On the other hand, if the user is constantly being prompted for recordings of the same word, then something more serious is wrong.

SUMMARY OF THE INVENTION

In accordance with the inventive arrangements, after N misrecognitions of a word, a speech application displays the record dialog M times for all words, including the high-frequency words. If the system continues to misrecognize the word, a Correction (Record Word) Wizard opens to help the user diagnose the problem. The wizard can save the sentence containing the word in a temporary file and can check the audio quality of the word. If the quality is bad, the Wizard can lead the user through microphone setup. The Wizard can then prompt the user to record the word, display the text of the saved sentence and ask the user to re-dictate the sentence. If the audio of the word in context, as represented by the in-context base form, is markedly different from the audio of the word dictated in isolation, as represented by the in-isolation base form, the in context audio is also saved.

The wizard then plays back the new pronunciation of the word and has the user dictate a new sentence. The speech application recognizes the sentence and displays the result for the user to see if the speech application now properly recognizes the word. When speaking of a speech application as recognizing words and sentences and commands, the term recognizing should be interpreted as exercising the various algorithms in the speech application in an effort to correctly translate the spoken words, sentences and commands into text. Complete success should not be implied in the term, as recognition can result in one or more misrecognized words or commands.

For commands, the Wizard enables the user to create a new macro to perform the command. If, for example, the application failed to recognize NEW-PARAGRAPH no matter what the user did, the user could change the command to something else, for example, START-PARAGRAPH.

If the word continues to be misrecognized, the application can save the context in a file so it can be sent to the developer of the speech application for analysis.

The user can choose to use the Wizard during correction or postpone use of the Wizard until later. When the file is closed, the system asks the user if he or she wants to perform the Wizard then. If not, information for the misrecognized word or words is saved and the user can choose to work with the words at a later time. There are user options to set how many words would be saved. If the application reaches this limit, then the application can automatically begin replacing the oldest words. The application can give the user a visual indication that there are words for the user to work with.

A method for correcting a frequently misrecognized word or command (word/command) in a speech application, in accordance with the inventive arrangements comprises the steps of: detecting a need for correcting a frequently misrecognized word/command spoken by a user into a microphone; recording the misrecognized word/command in isolation; establishing an in-isolation base form for the misrecognized word/command from the in-isolation recording; saving the in-isolation base form; recording the misrecognized word/command in context; establishing an in-context base form for the misrecognized word/command from the context recording; comparing the in-isolation and the in-context base forms to one another; saving the in-context base form only if the in-isolation and the in-context base forms are markedly different from one another; displaying a sentence using the frequently misrecognized word/command in context; prompting the user to speak the sentence; recognizing the sentence with the speech application; prompting the user to confirm whether or not the frequently misrecognized word/command was properly recognized; and, terminating the method if the frequently misrecognized word/command was properly recognized.

In those situations where the user confirms that the frequently misrecognized word/command was not properly recognized, the method further comprises the steps of: creating a macro for an alternative way to dictate the frequently misrecognized word/command; displaying a sentence using the macro in place of the frequently misrecognized word/command in context; prompting the user to speak the sentence; recognizing the sentence with the macro with the speech application; prompting the user to confirm whether or not the frequently misrecognized word/command was properly recognized; and, terminating the method if the frequently misrecognized word/command was properly recognized.

Immediately after the need detecting step, the method can further comprise the steps of: prompting the user to choose between running the method now and delaying the method; and, proceeding to the step of recording the misrecognized word/command in isolation only in response to an affirmative command from the user.

Immediately after the need detecting step, the method can also further comprise the steps of: testing audio quality of the microphone; and, if the audio quality is unsatisfactory, setting up the microphone before proceeding to the step of recording the misrecognized word/command in isolation only in response to a command from the user.

Immediately after the need detecting step, the method can also further comprise the steps of: prompting the user to choose between running the method now and delaying the method; if the user chooses to run the method now, testing audio quality of the microphone; and, if the audio quality is unsatisfactory, setting up the microphone before proceeding to the step of recording the misrecognized word/command in isolation only in response to a command from the user.

The sentence displayed in the step of displaying a sentence using the frequently misrecognized word/command in context can be the same sentence from the step of recording the misrecognized word/command in context.

The sentence displayed in the step of displaying a sentence using the macro in place of the frequently misrecognized word/command in context can also be the same sentence from the step of recording the misrecognized word/command in context.

The method can further comprise the step of saving the in-context recordings if the sentence using the macro in place of the frequently misrecognized word/command in context was not properly recognized by the speech application.

In those situations where the user chose to delay initiating the method, the method can further comprise the steps of: waiting until dictation is terminated; prompting the user to choose between running the method now and not running the method; and, proceeding to the step of recording the misrecognized word/command in isolation only in response to an affirmative command from the user.

DETAILED DESCRIPTION OF THE PREFERRED EMBODIMENTS

Figure 1:
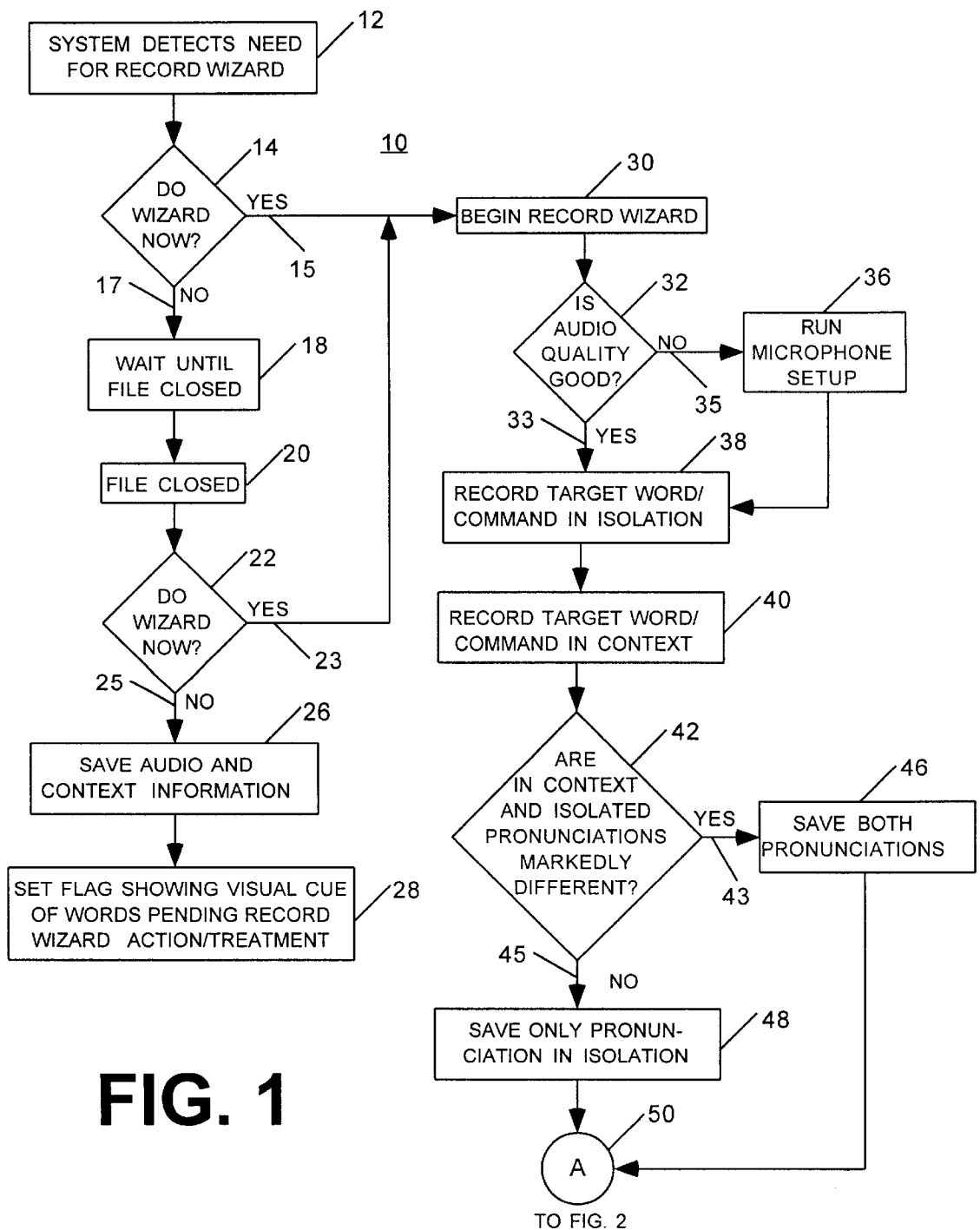
FIG. 1 is a first part of a flow chart for implementing a Record Wizard in accordance with the inventive arrangements.
Figure 2:
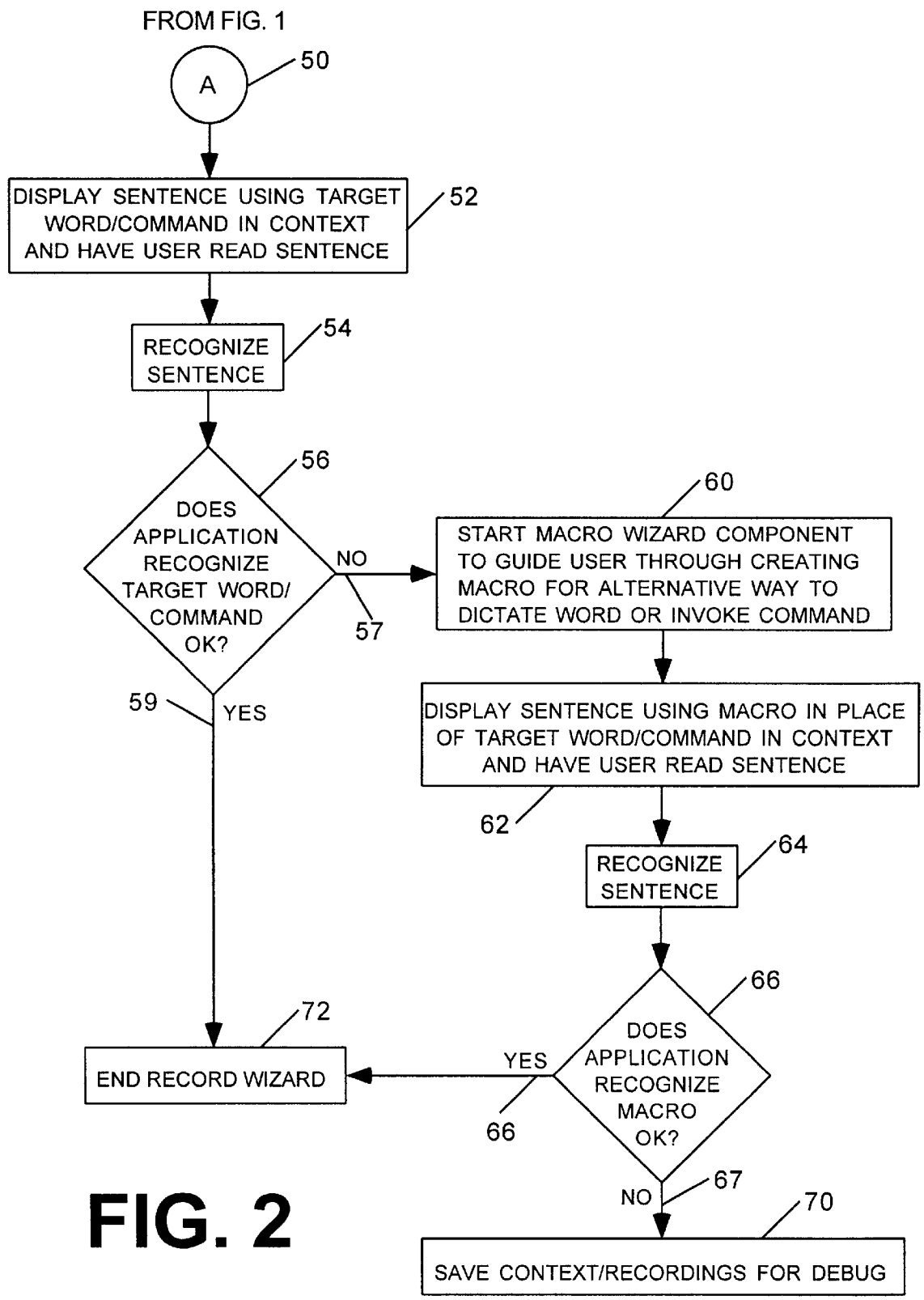
FIG. 2 is the second part of the flow chart shown in FIG. 1.

A method 10 for diagnosing and correcting, or overcoming, repeated misrecognitions of the same words, in accordance with the inventive arrangements, is illustrated by a flow chart in FIGS. 1 and 2. After N misrecognitions of a word, where N is a small integer, for example 3, a speech application displays the record dialog M times for all words, including the high-frequency words, where M is also a small integer, for example 2. If the application continues to misrecognize the word, a Correction (Record Word) Wizard recognizes the need to help the user diagnose the misrecognition problem. This corresponds to the step of block 12 in method 10. It will be appreciated that the term wizard generally refers to a user interface implemented in a very friendly manner, and in that sense, Record Word Wizard can be thought of as a name for the method taught herein.

The user is then prompted to choose whether to invoke the record word wizard in decision block 14. If the user chooses not to invoke the record word wizard, the method branches on path 17 to block 18, in which the application acknowledges that invocation of the record word wizard will be delayed until the file is closed. After the file is closed in accordance with the step of block 20, the user is then prompted once again to choose whether to invoke the record word wizard in decision block 22. If the user chooses not to invoke the record word wizard, the method branches on path 25 to block 26, in accordance with which audio and context information is saved. The method then concludes with setting a flag for showing a visual cue of those words requiring action or treatment by the record word wizard, in accordance with the step of block 28.

If the user chooses to invoke the record word wizard in accordance with the steps of decision blocks 14 or 22, the method branches on paths 15 and 23 respectively to block 30, in accordance with which the application invokes the record word wizard. The first possible problem area is the audio quality. The record word wizard initiates a test of the audio quality. If the audio quality is good, the method branches on path 33 to block 38. If the audio quality is not good, the method branches on path 35 to block 36, in accordance with which the microphone setup procedure is run. After setting up the microphone, the method moves to block 38.

The frequently misrecognized word can be in dictated speech or in a dictated command, referred to hereinafter as word/command, can be thought of a target word/command. The target word/command, is recorded in isolation in accordance with the step of block 38. Recording in isolation is recording only the word/command itself, without any context. Context is significant in word recognition applications because some words cannot be identified without context information, for example homonyms, whereas other words are so distinct as to be easily recognizable without context information. It will be appreciated that recognizing a word in context requires more processing time than recognizing a word out of context, or without context. Accordingly, after recording the target word/command in isolation, the target word/command is recorded in context in accordance with the step of block 40.

In decision block 42, the in-context and isolated pronunciations are compared to one another, by comparing the base forms which are generated from the respective recordings. If the pronunciations are markedly different, the method branches on path 43 to block 46, in accordance with which both pronunciations, that is both base forms, are saved. If the pronunciations are not markedly different, the method branches on path 45 to block 48, in accordance with which only the pronunciation in isolation, that is the in-isolation base form, is saved. Whether or not the base forms are markedly different from one another is determined in accordance with algorithms and procedures known to those skilled in the art.

Each of blocks 46 and 48 leads to jump point 50, designated A, which leads to the next step in block 52, shown in FIG. 2.

In accordance with the step of block 52, a sentence is displayed using the target word/command in context. This sentence can be the same sentence that was recorded in step 40. The user is then prompted to read the sentence. In accordance with the step of block 54, the application then recognizes the sentence.

If the application has not properly recognized the target word/command in accordance with the step of decision block 56, the method branches on path 57 to block 60.

In accordance with the step of block 60, a macro wizard component is initiated to guide the user through creation of a macro to enable an alternative way to dictate the word or invoke the command. The macro is then tested in accordance with the step of block 62. A sentence is displayed using the macro in place of the target word/command in context. One again, this sentence can be the same sentence that was recorded in step 40, but for substitution of the macro. The user is then prompted to read the sentence. In accordance with the step of block 64, the application then recognizes the sentence.

If the application has not properly recognized the macro in accordance with the step of decision block 66, the method branches on path 67 to block 70, in accordance with which the in-context recordings are saved for later debugging of the misrecognition problem.

If the application recognized the target word/command in decision block 56, the method branches on path 59 to block 72. If the application recognizes the macro in decision block 66, the method branches on path 69 to block 72. The record word wizard is ended in accordance with the step of block 72, the frequent misrecognition problem having been solved.

The inventive arrangements are unique in many respects. The method helps the user get a good recording of any word/command. The method allows recording of every word/command in context as well as in isolation. The method allows the user to record the pronunciation at any time, not just during correction. As part of the method, the user re-dictates the word/command to verify correction of the problem.

What is claimed is:

1. A method for correcting a frequently misrecognized word or command (word/command) in a speech application, comprising the steps of:

detecting a need for correcting a frequently misrecognized word/command spoken by a user into a microphone;

recording said misrecognized word/command in isolation;

establishing an in-isolation base form for said misrecognized word/command from said in-isolation recording;

saving said in-isolation base form;

recording said misrecognized word/command in context;

establishing an in-context base form for said misrecognized word/command from said context recording;

comparing said in-isolation and said in-context base forms to one another;

saving said in-context base form only if said in-isolation and said in-context base forms are markedly different from one another;

displaying a sentence using said frequently misrecognized word/command in context;

prompting said user to speak the sentence;

recognizing said sentence with said speech application;

prompting said user to confirm whether or not said frequently misrecognized word/command was properly recognized; and, terminating said method if said frequently misrecognized word/command was properly recognized.

2. The method of claim 1, wherein said user confirms that said frequently misrecognized word/command was not properly recognized, and further comprising the steps of:

creating a macro for an alternative way to dictate said frequently misrecognized word/command;

displaying a sentence using said macro in place of said frequently misrecognized word/command in context;

prompting said user to speak the sentence;

recognizing said sentence with said macro with said speech application;

prompting said user to confirm whether or not said frequently misrecognized word/command was properly recognized; and, terminating said method if said frequently misrecognized word/command was properly recognized.

3. The method of claim 2, wherein said sentence displayed in said step of displaying a sentence using said macro in place of said frequently misrecognized word/command in context is the same sentence from said step of recording said misrecognized word/command in context.

4. The method of claim 2, further comprising the step of saving said in-context recordings if said sentence using said macro in place of said frequently misrecognized word/command in context was not properly recognized by said speech application.

5. The method of claim 2, wherein immediately after said need detecting step, said method further comprises the steps of:

prompting said user to choose between running said method now and delaying said method; and, proceeding to said step of recording said misrecognized word/command in isolation only in response to an affirmative command from said user.

6. The method of claim 2, wherein immediately after said need detecting step, said method further comprises the steps of:

testing audio quality of said microphone; and, if said audio quality is unsatisfactory, setting up said microphone before proceeding to said step of recording said misrecognized word/command in isolation only in response to a command from said user.

7. The method of claim 2, wherein immediately after said need detecting step, said method further comprises the steps of:

prompting said user to choose between running said method now and delaying said method;

if said user chooses to run said method now, testing audio quality of said microphone; and, if said audio quality is unsatisfactory, setting up said microphone before proceeding to said step of recording said misrecognized word/command in isolation only in response to a command from said user.

8. The method of claim 2, wherein said sentence displayed in said step of displaying a sentence using said frequently misrecognized word/command in context is the same sentence from said step of recording said misrecognized word/command in context.

9. The method of claim 8, wherein said sentence displayed in said step of displaying a sentence using said macro in place of said frequently misrecognized word/command in context is the same sentence from said step of recording said misrecognized word/command in context.

10. The method of claim 2, wherein said sentence displayed in said step of displaying a sentence using said macro in place of said frequently misrecognized word/command in context is the same sentence from said step of recording said misrecognized word/command in context.

11. The method of claim 1, wherein immediately after said need detecting step, said method further comprises the steps of:

prompting said user to choose between running said method now and delaying said method; and, proceeding to said step of recording said misrecognized word/command in isolation only in response to an affirmative command from said user.

12. The method of claim 11, further comprising the steps of:

waiting until dictation is terminated;

prompting said user to choose between running said method now and not running said method; and, proceeding to said step of recording said misrecognized word/command in isolation only in response to an affirmative command from said user.

13. The method of claim 1, wherein immediately after said need detecting step, said method further comprises the steps of:

testing audio quality of said microphone; and, if said audio quality is unsatisfactory, setting up said microphone before proceeding to said step of recording said misrecognized word/command in isolation only in response to a command from said user.

14. The method of claim 1, wherein immediately after said need detecting step, said method further comprises the steps of:

prompting said user to choose between running said method now and delaying said method;

if said user chooses to run said method now, testing audio quality of said microphone; and, if said audio quality is unsatisfactory, setting up said microphone before proceeding to said step of recording said misrecognized word/command in isolation only in response to a command from said user.

15. The method of claim 1, wherein said sentence displayed in said step of displaying a sentence using said frequently misrecognized word/command in context is the same sentence from said step of recording said misrecognized word/command in context.

16. The method of claim 15, wherein said sentence displayed in said step of displaying a sentence using said macro in place of said frequently misrecognized word/command in context is the same sentence from said step of recording said misrecognized word/command in context.

* * * * *